(12) United States Patent
Chen

(10) Patent No.: US 7,073,774 B2
(45) Date of Patent: Jul. 11, 2006

(54) AIR INTAKE ADJUSTING ASSEMBLY FOR PNUEMATIC TOOLS

(75) Inventor: Lung-Hui Chen, Hsinchu (TW)

(73) Assignee: Sunmatch Industrial Co., Ltd., Hsinchu (TW)

( * ) Notice: Subject to any disclaimer, the term of this patent is extended or adjusted under 35 U.S.C. 154(b) by 41 days.

(21) Appl. No.: 10/921,813

(22) Filed: Aug. 20, 2004

(65) Prior Publication Data

US 2006/0038148 A1 Feb. 23, 2006

(51) Int. Cl.
*F16K 5/10* (2006.01)
(52) U.S. Cl. ........................ 251/208; 251/304
(58) Field of Classification Search ................ 251/208
See application file for complete search history.

(56) References Cited

U.S. PATENT DOCUMENTS 6,230,607 B1 * 5/2001 Rehrl et al. ................... 91/418

2005/0029481 A1 * 2/2005 Chuang ....................... 251/208

* cited by examiner

*Primary Examiner*—J. Casimer Jacyna
(74) *Attorney, Agent, or Firm*—Birch, Stewart, Kolasch, and Birch, LLP

(57) ABSTRACT

This invention discloses an air intake adjusting assembly for pneumatic tools, which rearranges the air intake adjusting assembly between the main body and the air intake section of a pneumatic tool, such that the air intake adjusting assembly will not be covered when a user is operating the pneumatic tool, and also provides a comfortable grip for users. The air intake adjusting assembly according to the present invention comprises an air intake adjusting knob being installed at the external periphery of an air intake member for adjusting the diameter of an adjusting hole of the air intake member by steplessly rotating the air intake adjusting knob as to adjust the air flow of the pneumatic tool and achieve the effect of steplessly controlling the rotation speed of the pneumatic tool.

4 Claims, 7 Drawing Sheets

AIR INTAKE ADJUSTING ASSEMBLY FOR PNUEMATIC TOOLS

FIELD OF THE INVENTION

The present invention generally relates to an air intake adjusting assembly, more particularly to an air intake adjusting assembly that rearranges the position of the air intake adjusting mechanism in a pneumatic tool for adjusting the air intake as well as the rotation speed of the pneumatic tool.

BACKGROUND OF THE INVENTION

In view of the prior-art technology of the pneumatic tools, the air flow controlled by the rotation speed of a rotor in a control chamber is a well-known art. At present, there are different structural designs for the air intake adjusting assembly, and most traditional air intake adjusting assemblies use a screw rod 11a to change the air flowing into a chamber as shown in FIGS. 1 and 2. By rotating the screw rod 11a into or out from a main body 10a, the diameter of an air intake passage 13a is decreased or increased as to adjust the flow of air entering from the air intake section 12a. However, the air intake adjusting assembly according to such technology is installed into a chamber interconnected to the main body 10a. When a driving device 14a is pressed to operate a pneumatic tool, the air intake adjusting assembly will be covered. Such result not only makes the grip uncomfortable to users, but also makes the adjustment of the air flow impossible. Therefore, it is necessary to stop operating the pneumatic tool first before making adjustments by the air intake adjusting assembly, which is very inconvenient to users. Further, since it is unable to simultaneously operate the pneumatic tool and the air intake adjusting assembly, therefore the air flow cannot be adjusted precisely. Users have to stop operating the pneumatic tool and rotate the screw rod 11a into or out from the main body 10a of the pneumatic tool and then test the pneumatic tool to check whether or not the air flow of the entering air is appropriate. This procedure is repeated until the air flow is adjusted to the desired level, and the procedure of adjusting the air intake adjusting assembly wastes a lot of time. Furthermore, since the air intake adjusting assembly is disposed at the main body 10a, therefore the screw rod 11a will be touched very easily during the operation of the pneumatic tool and thus the screw rod 11a will be driven to rotate and change the flow of the air intake and definitely will affect the operation of the pneumatic tool.

SUMMARY OF THE INVENTION

Therefore it is the primary objective of the present invention to provide an air intake adjusting assembly disposed between a main body and an air intake section of a pneumatic tool. The pneumatic tool and the air intake adjusting assembly can be operated simultaneously to prevent the air intake adjusting assembly from being covered when the pneumatic tool is operated, which results in an uncomfortable grip to users, and makes the adjustment of air flow impossible. The present invention further provides a convenient and precise way of adjusting the air flow and controlling the rotation speed of the pneumatic tool.

To achieve the foregoing objectives, the present invention provides an air intake mechanism which comprises:

an air intake member, having an air inlet and an air outlet disposed on both ends of the air intake member and connected to the air intake section and the main body respectively;

two adjusting holes, being disposed at an adjusting section between the air inlet and the air outlet; and an air intake adjusting knob, being rotably disposed at the external periphery of the air intake member and having an adjusting groove corresponding to the adjusting hole;

such that when the air intake adjusting knob is rotated, the adjusting groove displaces with respect to the adjusting hole to vary the diameter of the adjusting hole being covered by the adjusting groove as to adjust the air flow for steplessly changing the rotation speed of the pneumatic tool.

The above objects, features and advantages of the present invention will become apparent from the following detailed description taken with the accompanying drawing.

DETAILED DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

Figure 1:
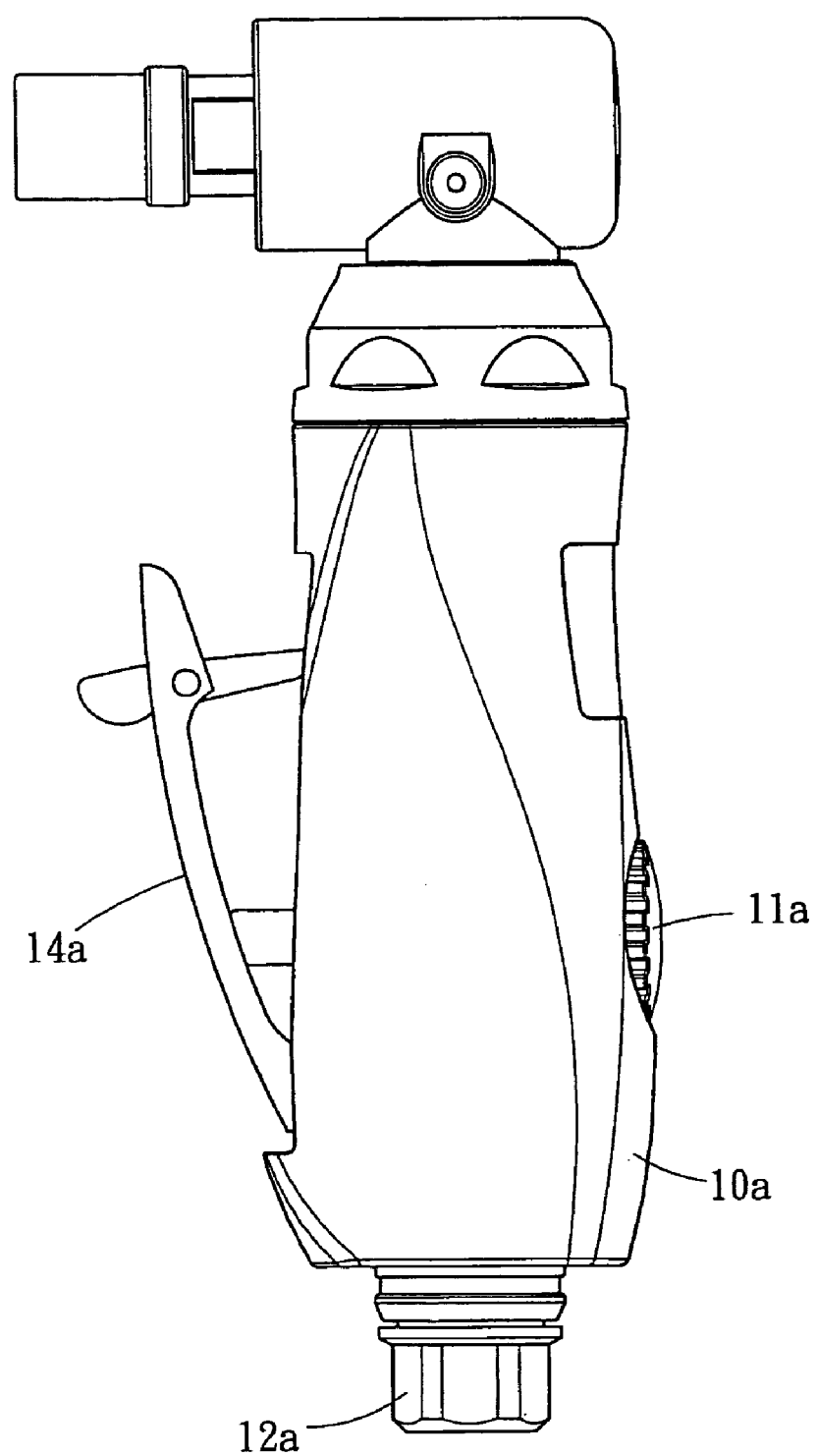
FIG. 1 is an illustrative view of a prior-art pneumatic tool.
Figure 2:
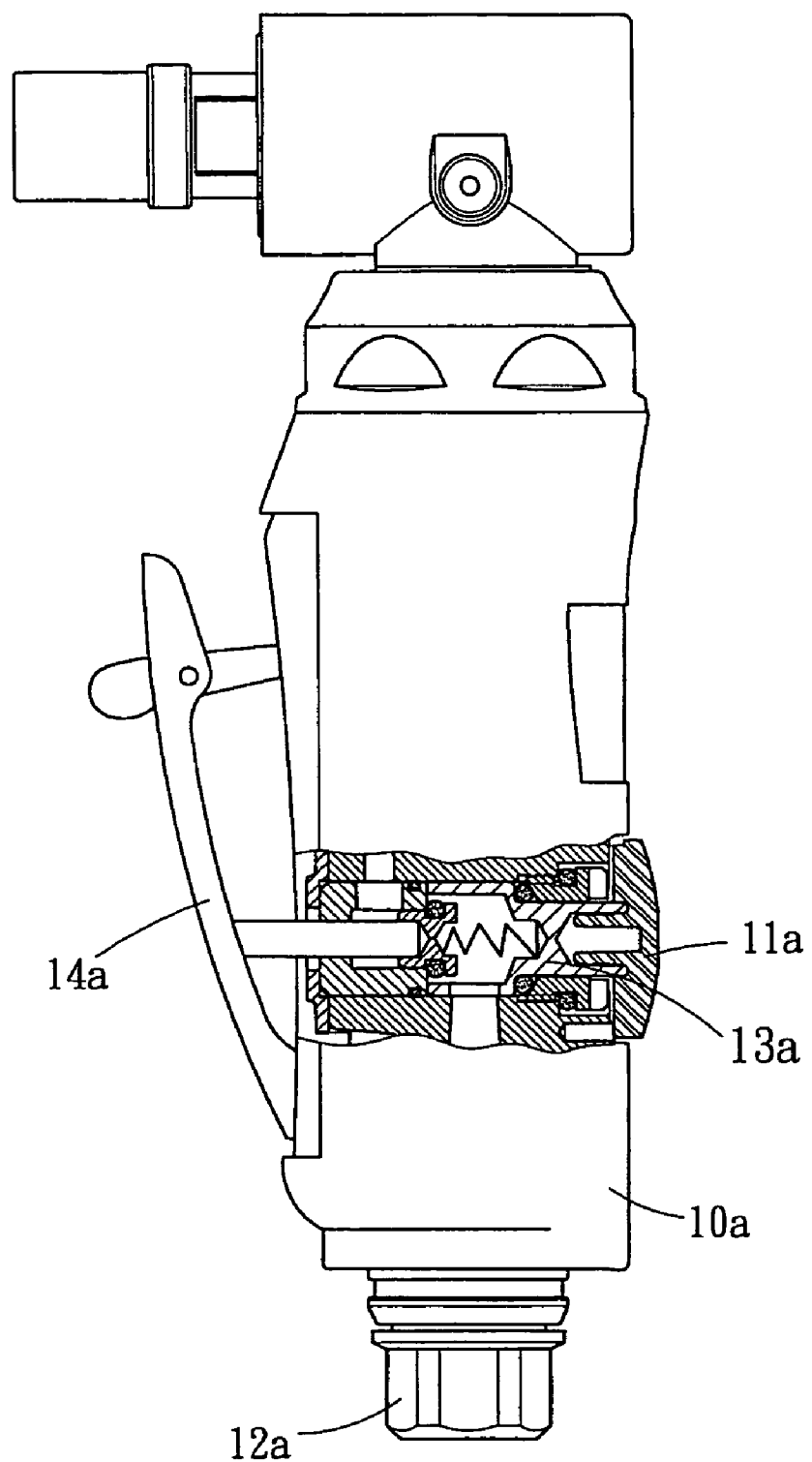
FIG. 2 is a cross-sectional view of the adjusting knob of a prior-art pneumatic tool.
Figure 3:
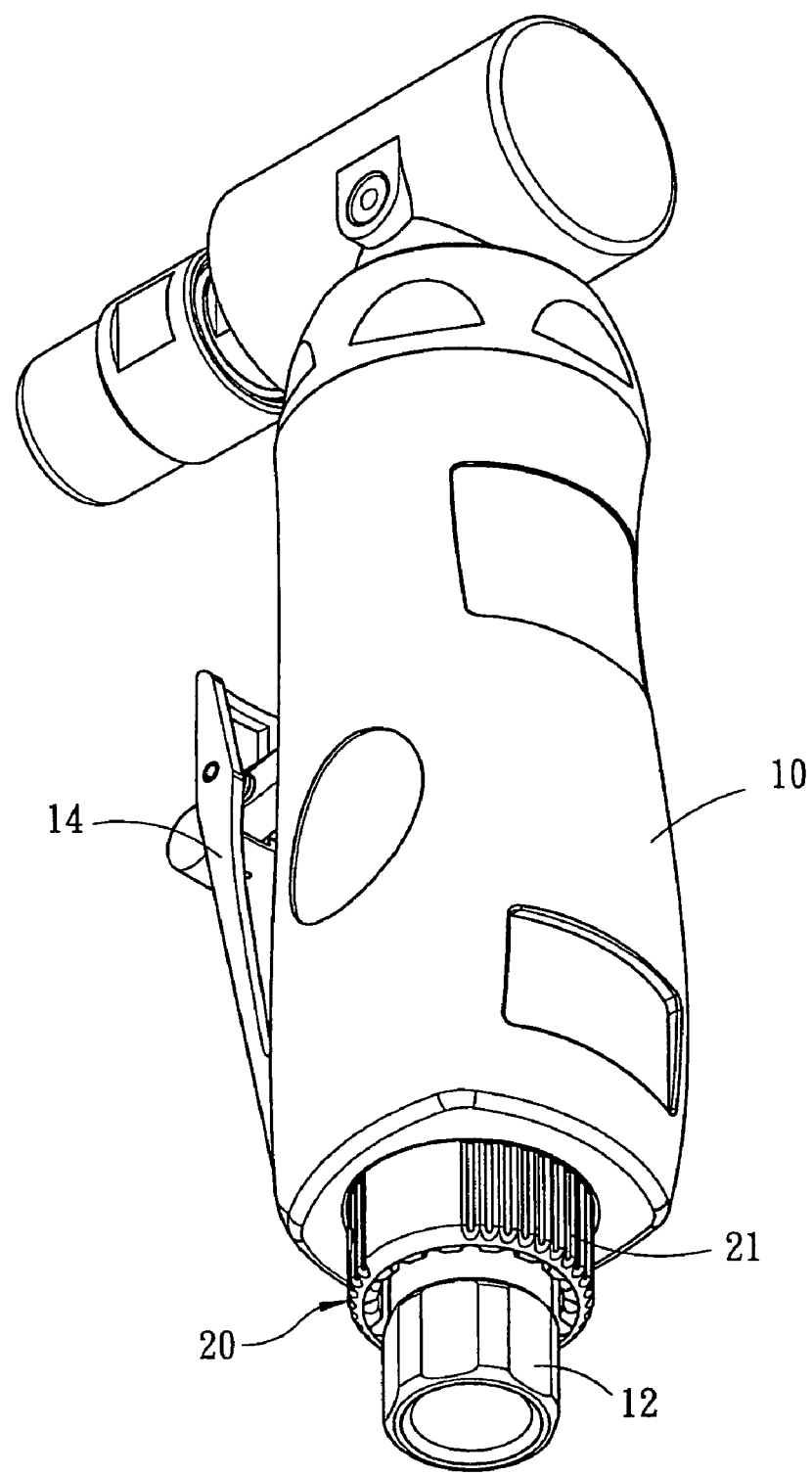
FIG. 3 is a perspective view of a pneumatic tool according to a present invention.
Figure 4:
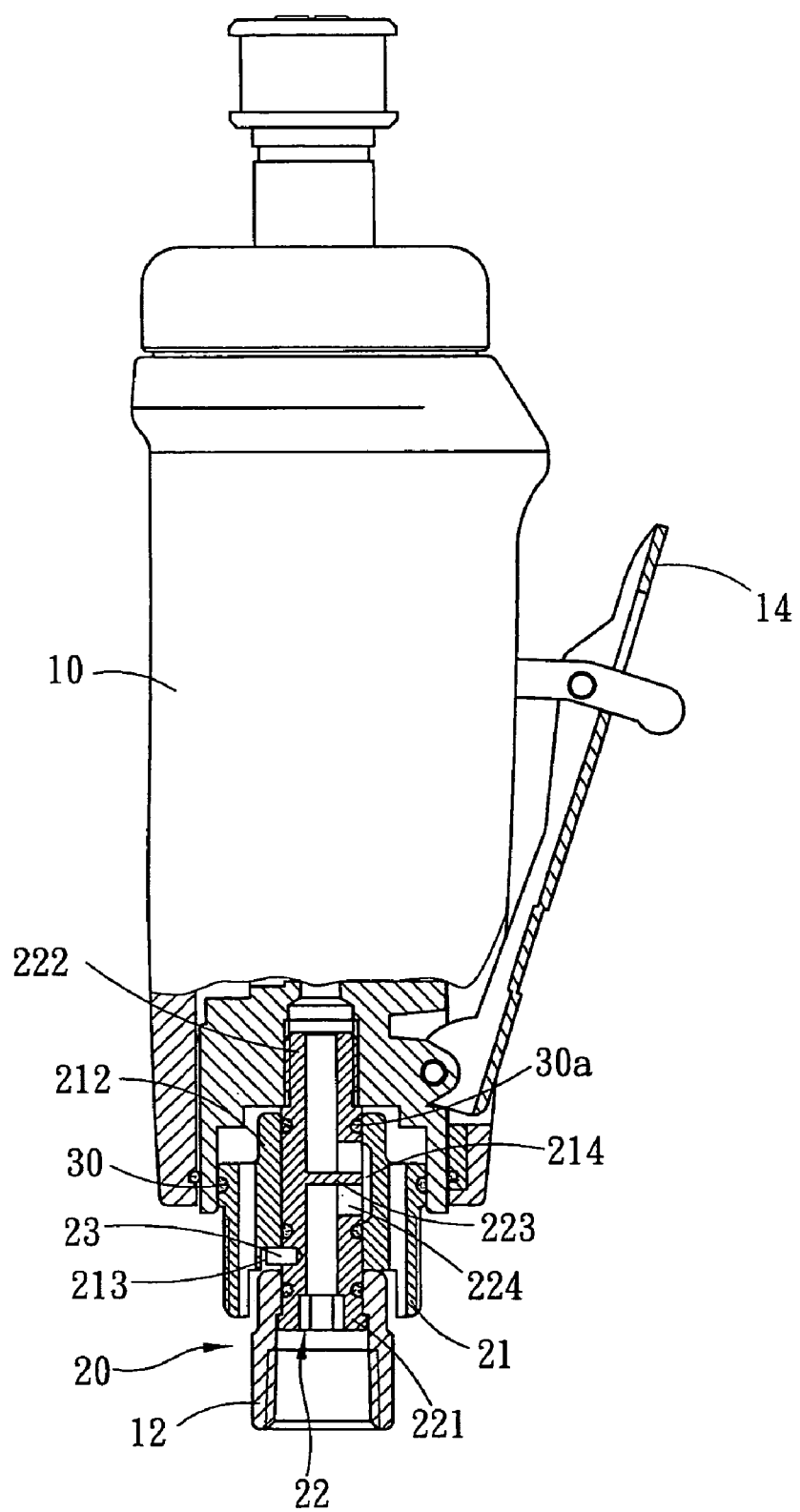
FIG. 4 is a partial cross-sectional view of a pneumatic tool according to a present invention.
Figure 5:
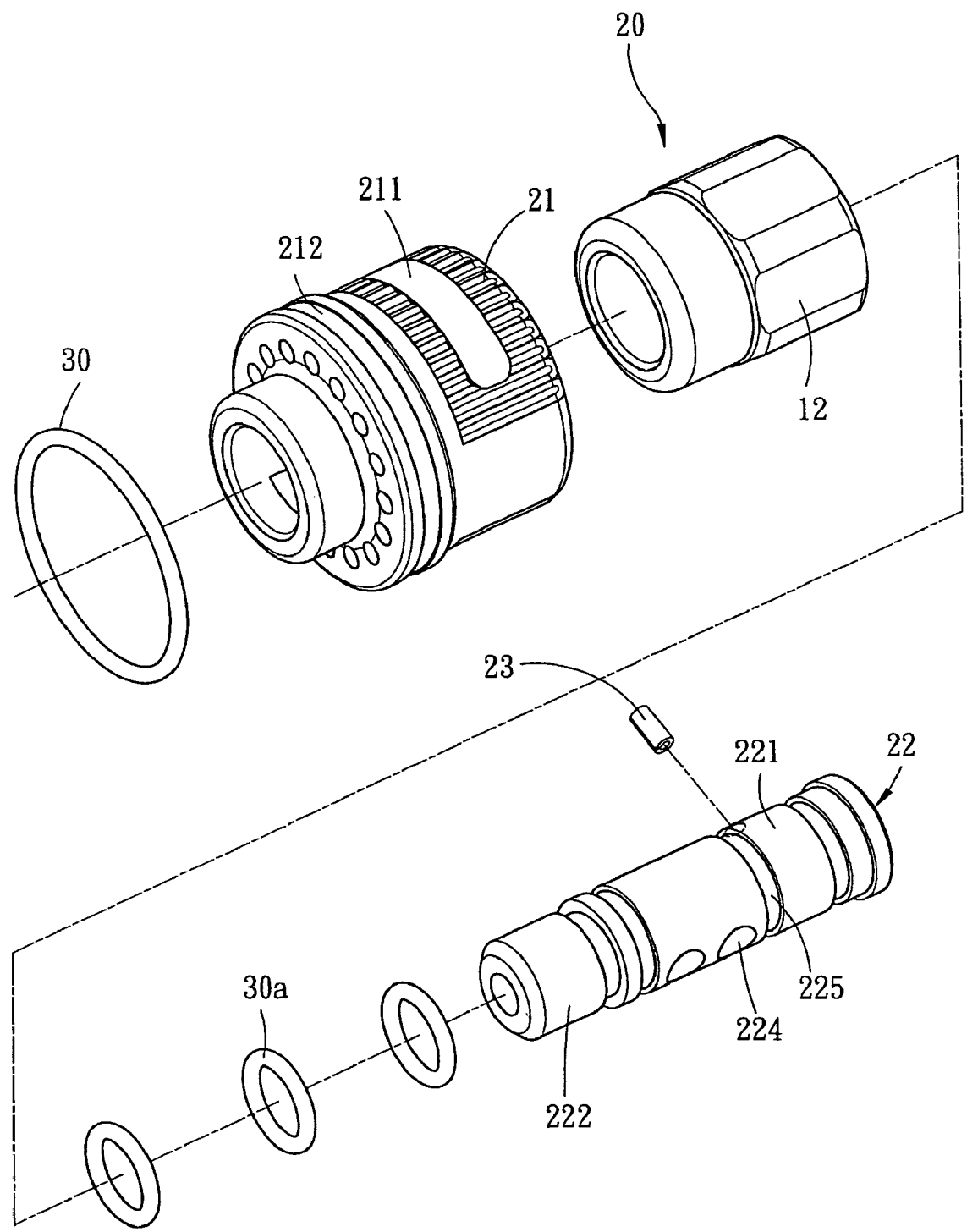
FIG. 5 is an exploded view of the air intake adjusting mechanism according to the present invention.
Figure 6:
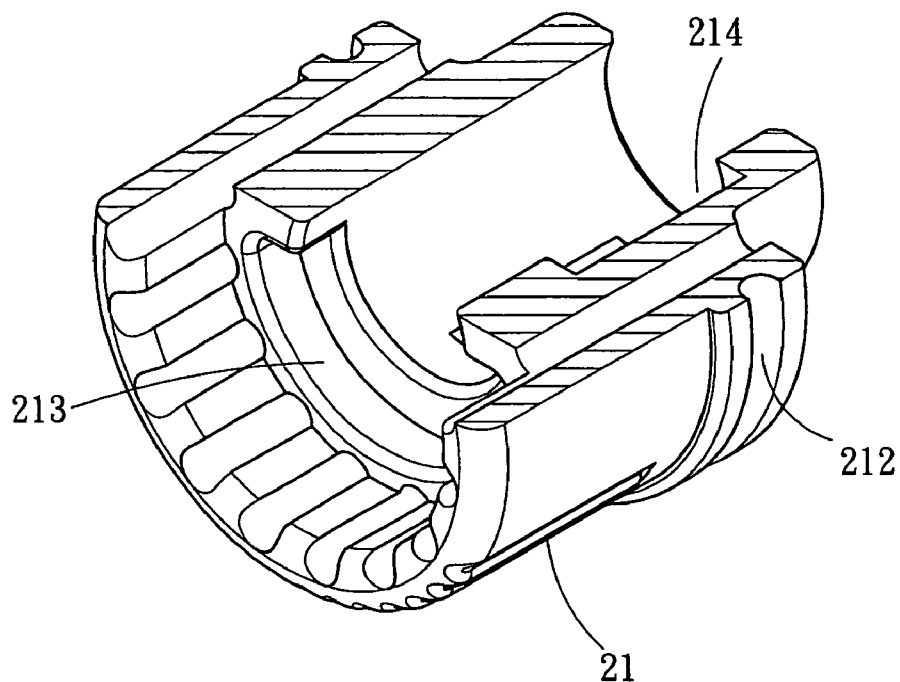
FIG. 6 is a cross-sectional view of the air intake adjusting mechanism according to the present invention.
Figure 7:
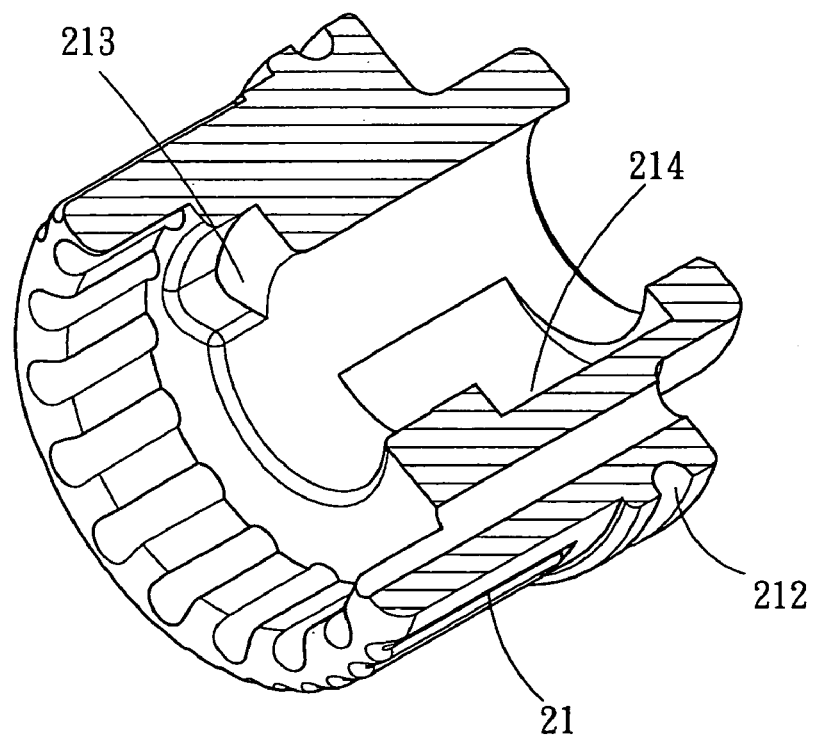
FIG. 7 is another cross-sectional view of the air intake adjusting mechanism according to the present invention.

Please refer to FIGS. 3 to 5 for the perspective view, the cross-sectional view and the exploded view of the air intake mechanism according to the present invention. The present invention discloses an air intake mechanism 20 of a pneumatic tool, which is installed between an air intake section 12 and the main body 10 of the pneumatic tool. When a driving member 14 is pressed for operating the pneumatic tool, the air intake adjusting mechanism will not be blocked, and thus users can adjust the air flow precisely. The air intake adjusting mechanism 20 comprises an air intake member 22 and an air intake adjusting knob 21 rotably disposed on the external periphery of the air intake member 22; wherein the air intake member 22 is substantially in a hollow tubular shape and has a partition board 223 for separating an air inlet 221 and an air outlet 222 which is not interconnected to the air inlet 221. The air intake section 12 is sheathed into the air inlet 221 of the air intake member 22, and the inlet 221 and the outlet 222 individually have an adjusting hole 224 vertically passing through the wall of the air intake member 22. Please refer to FIGS. 6 and 7. The air intake adjusting knob 21 has an adjusting groove 214 corresponding to the adjusting hole 224. A top pin 23 is disposed between the air inlet 221 of the air intake member 22 and the adjusting groove 214, and the air intake adjusting knob 21 comprises a latch groove 213 corresponding to the top pin 23, such that the top pin 23 can be pivotally coupled to the latch groove 213. By rotating the air intake adjusting knob 21, the top pin 23 moves with respect to the latch groove 213 as to move the air intake member 22 within a predetermined area of the latch groove 213. By rotating the air intake adjusting knob 21, the adjusting groove 214 moves with respect to the adjusting hole 224 to adjust the diameter of the adjusting hole 224 being covered by the adjusting groove 214, 50 that the air flow passing through the air intake member 22 can be adjusted for steplessly controlling the rotation speed and making the operation of the pneumatic tool more convenient.

Further, an adjusting calibration area 211 is disposed on the external periphery of the air intake adjusting knob 21 at a position corresponding to the latch groove 213, so that when a user rotates the air intake adjusting knob 21, the range of adjustment made by the user is shown. A circular groove 225 is disposed at the inlet 221 and the outlet 222 of the air intake member 22 for installing an airtight member 30a and preventing air leakage. Further, the foregoing circular groove 212 is disposed on the air intake adjusting knob 21 for installing the airtight member 30, which can achieve the effect of preventing air leakage.

Figure 8A:
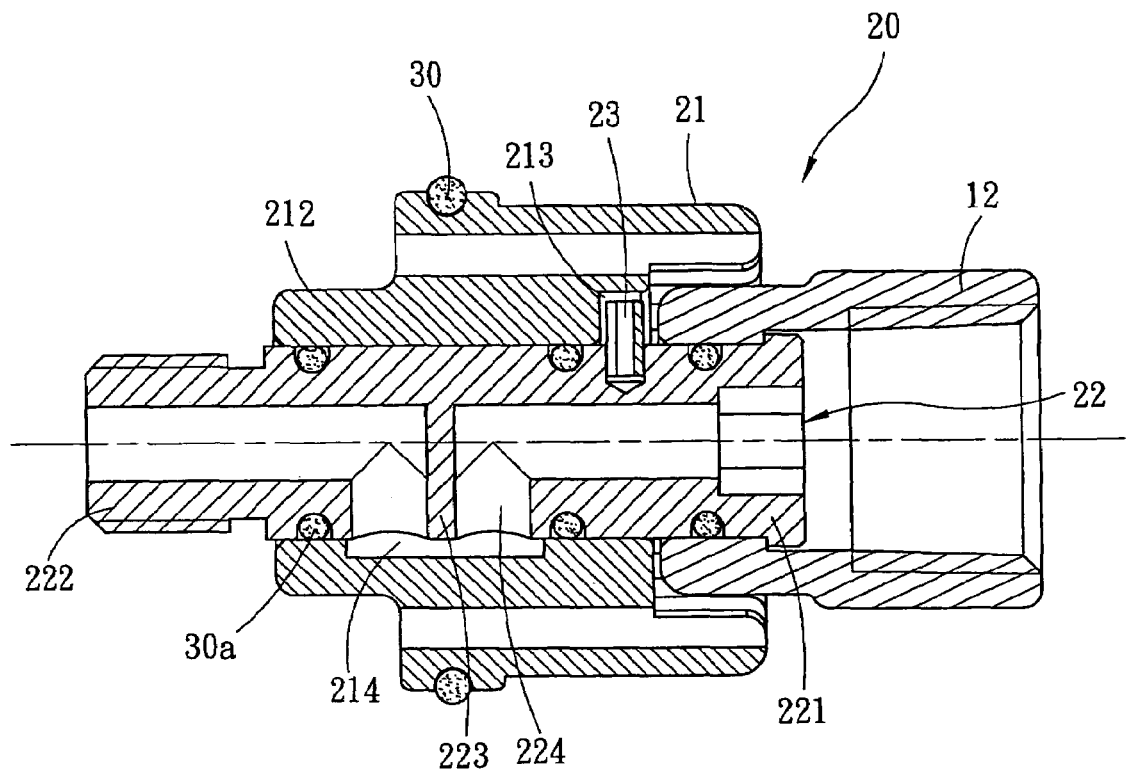
FIG. 8A is a cross-sectional view of the air intake adjusting mechanism being adjusted to a maximum air flow according to the present invention.

Please refer to FIG. 8A for the illustrative view of the air intake adjusting mechanism being adjusted to the maximum air flow. In FIG. 8A, when the pneumatic tool is operated in its maximum rotation speed, all air flow from the air intake section 12 into the air inlet 221 of the air intake member 22 and the adjusting groove 214 of the air intake adjusting knob 21 completely covers the diameter of the adjusting hole 224, so that the adjusting hole 224 is fully opened and the air flows out from the adjusting hole 224 of the air inlet 221 into the adjusting hole 224 of the air outlet 222, and then enters from the air outlet 22 into the pneumatic rotor (not shown in the figure) of the pneumatic tool as to drive the pneumatic rotor to rotate in a full speed.

Figure 8B:
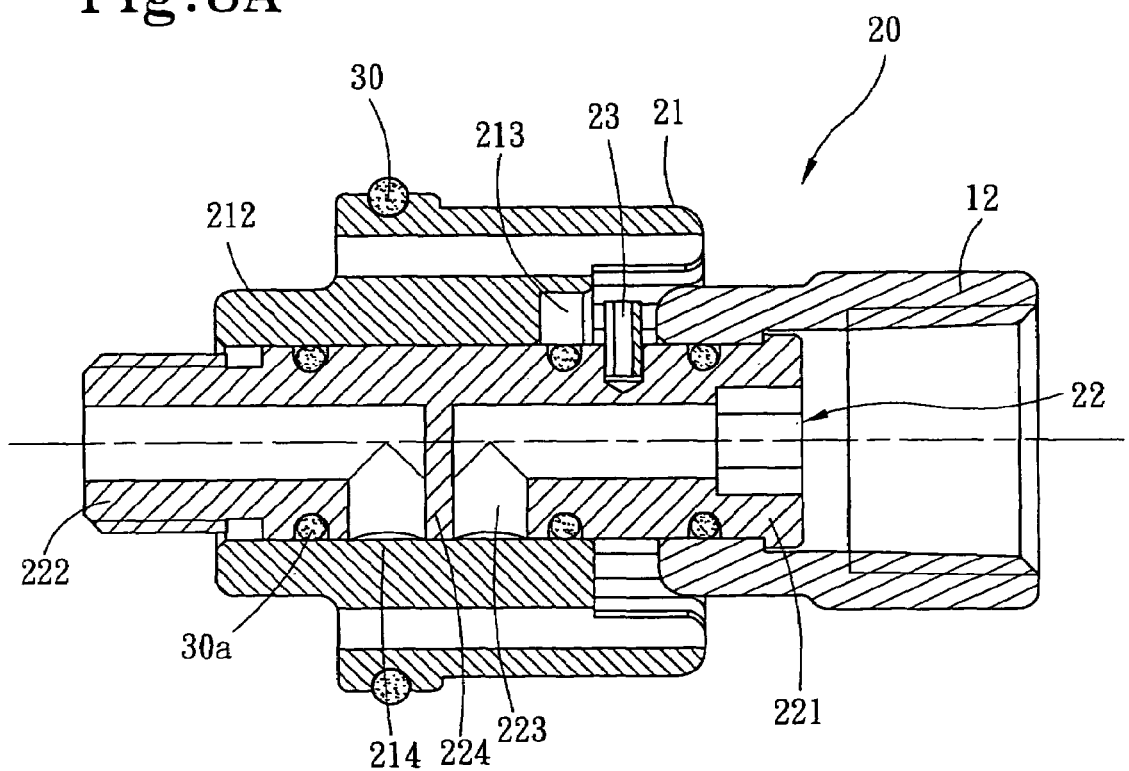
FIG. 8B is a cross-sectional view of the air intake adjusting mechanism being adjusted to a minimum air flow according to the present invention.

Please refer to FIG. 8B for the illustrative view of the air intake adjusting mechanism being adjusted to the minimum air flow. In FIG. 8B, when the pneumatic tool is operated in its minimum rotation speed, the air flows from the air intake section 12 into the air outlet 221 of the air intake member 22 and the adjusting groove 214 of the air intake adjusting knob 21 completely covers the diameter of the adjusting hole 224, so that the adjusting hole 224 is fully sealed and air cannot flow from the adjusting hole 224 of the air inlet 221 into the adjusting hole 224 of the air outlet 222 as to stop the pneumatic tool from driving the rotor to rotate.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An air intake adjusting assembly for pneumatic tools, being installed between a main body and an air intake section for inputting a gas into a pneumatic tool and comprising:

an air intake member, being in a hollow tubular shape and having a partition board disposed therein for separating an air inlet and an air outlet and said air inlet and said air outlet being coupled with said air intake section and said main body respectively and an adjusting hole disposed individually at said air inlet and said air outlet; and an air intake knob, being rotably disposed at the external periphery of said air intake member and having an adjusting groove corresponding to said adjusting hole;

thereby when said air intake adjusting knob is rotated, said adjusting groove displaces with respect to said adjusting hole to adjust the diameter of said adjusting hole for covering said adjusting groove as to adjust the air flow entering from said air intake section into said main body; wherein said air intake section is sheathed into said air inlet of said air intake member, and a top pin is disposed between said air inlet and said adjusting groove of said air intake member and said air intake adjusting knob comprises a latch groove corresponding to said top pin such that said top pin is pivotally coupled to said latch groove for rotating said air intake adjusting knob and said air intake member correspondingly.

2. The air intake adjusting assembly for pneumatic tools of claim 1, wherein said air intake adjusting knob comprises an adjusting calibration section disposed at the external periphery of said air intake adjusting knob corresponding to said latch groove.

3. The air intake adjusting assembly for pneumatic tools of claim 1, wherein said air inlet and said adjusting section of said air intake member comprise a plurality of circular grooves for installing an airtight member to prevent an air leakage.

4. The air intake adjusting assembly for pneumatic tools of claim 3, wherein said air intake adjusting knob comprises a circular groove for installing said airtight member and preventing an air leakage.

* * * * *